Aug. 13, 1940.　　　K. KOWALKIEWICZ　　　2,211,063
INFLATING DEVICE
Filed April 3, 1937
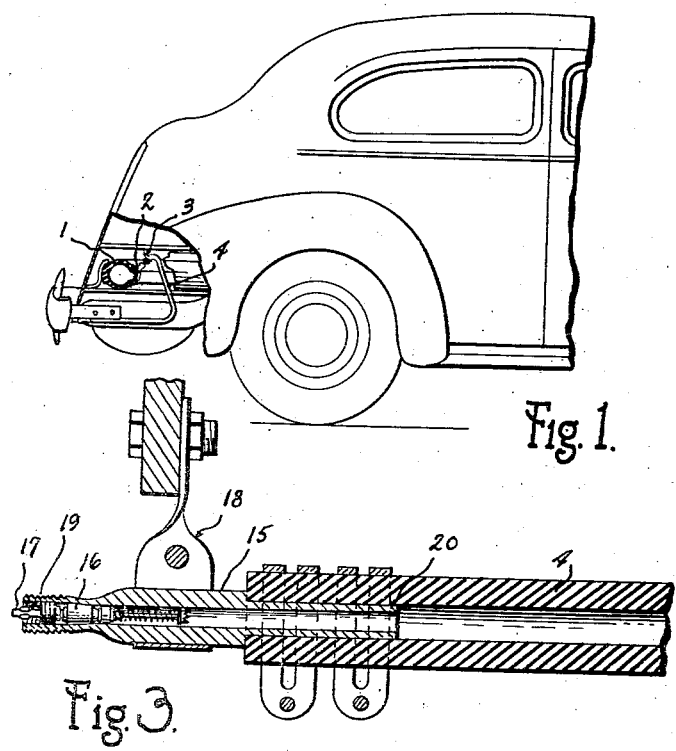
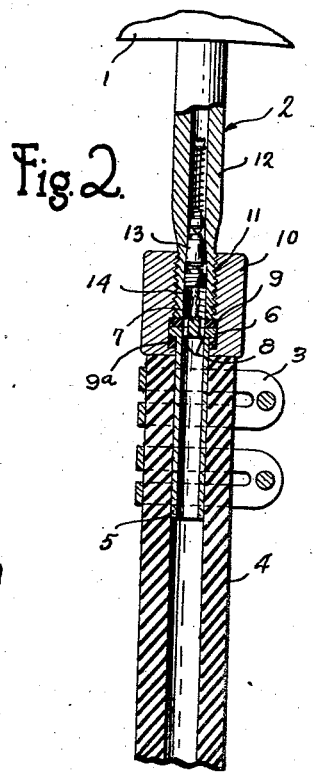
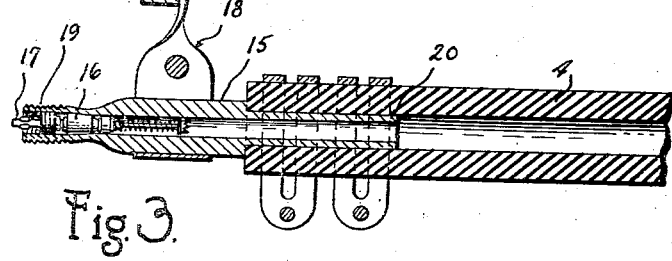
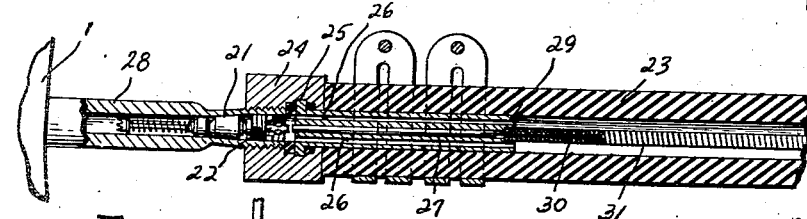
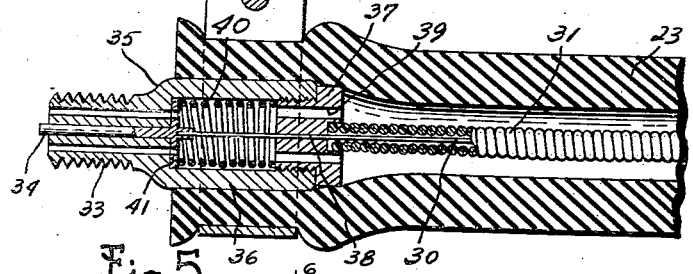
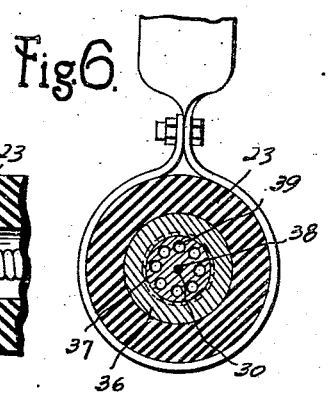
INVENTOR.
Kasimir Kowalkiewicz
BY Louis Chayka
ATTORNEY.

Patented Aug. 13, 1940

2,211,063

UNITED STATES PATENT OFFICE 2,211,063

INFLATING DEVICE

Kasimir Kowalkiewicz, Holyoke, Mass.

Application April 3, 1937, Serial No. 134,756

1 Claim. (Cl. 152—415)

In particular, my invention is devised to facilitate the inflation of spare tires carried in the back of automobiles in a closed compartment, especially in the back trunk. It is a common practice of manufacturers of automobiles to provide a space for the extra tire in the trunk, where the tire is protected by a lock installed in the cover of the trunk and where the tire is held by clamps in readiness for an emergency. The interior of the trunk is also used ordinarily for baggage or loose clothing or laundry that may be piled over the spare tire, and yet, in order that the tire may serve in an emergency, it is desirable that it be always kept inflated. To accomplish this, it is necessary to unlock the cover of the trunk, to remove all movable objects such as baggage, so that access to the valve on the rim of the spare tire might be obtained.

To simplify this task, and to make it easy and convenient to inflate, deflate or to check the pressure of air within the tire, without the necessity of unlocking and opening the cover of the trunk, or other similar tire compartment, I have devised a combination of a tubular passageway for air and a suitable coupling with the air valve on the tire, and have located the outlet of the said tube at the rear of the vehicle on the outside where it is readily and immediately accessible for use.

I shall now proceed to describe my invention with reference to the accompanying illustrations, in which:

Fig. 1 shows the location of my improved combination with reference to the body of the automobile and the tire therein.

Fig. 2 shows a sectional view of the coupling of my device and that of the air valve to which it is attached.

Fig. 3 shows the sectional view of the exterior outlet of my tubular air passage and that of the fitting therein.

Fig. 4 shows a sectional view of a modified coupling of my tubular air passage as attached to the air valve of the tire.

Fig. 5 shows a sectional view of the exterior outlet of the modified tubular air passage.

Fig. 6 shows a transverse sectional view of the tubular connection taken on line 6—6 in Fig. 5.

Similar numerals refer to similar parts throughout the several views.

The spare tire indicated as a whole by 1 in Fig. 1 lies ordinarily in the trunk space of the automobile in a horizontal position, as partly shown in section in Fig. 1. The air valve 2 projects upward. Attached by clamp 3 to the frame or rack upon which the tire rests, is a rubber tube 4. A hollow stem 5, best made of metal, tightly fitted into the end of the rubber tube 4, terminates in an integrally constructed flanged head 6. The head carries a centrally located pin 7 and is provided with air passages 8, disposed in parallel to the axis of the tube 4. 9 is an annular washer adjoining said head 6 of the stem 5, and is made preferably of rubber. Another annular washer 9a, best made of rubber, encircles the stem 5 on the opposite side of the flange on head 6. A swivel member 10, bored centrally, rotates freely in either direction on the end of stem 5, closely embracing the flanged head 6 of said stem. The inside surface of said member 10, from a point adjacent the washer 9 to the orifice of said member 10, is threaded to fit the threaded nipple 11 of the tire valve stem 12, which is equipped with the standard valve 13, commonly known as the Schraeder valve, of which pin 14 is a part. The other end of the tube 4, terminating externally of the automobile, is also provided with a metal stem 20, said stem being joined removably or integrally to a standard valve stem 15 of the kind used in pneumatic tires and is also equipped with a standard valve 16 of the type known as the Schraeder valve, of which valve pin 17 projecting slightly out of the stem is a part. A clamp 18, suitably suspended from the body of the automobile, holds the stem 15 of the valve and the lower end of the tube 4 firmly in place. The end 19 of the stem is threaded to receive a conventional dust cap.

The manner in which the combination works is as follows:

When tire 1 is placed on its rack within the trunk space of the automobile, with the valve stems upward, the end of the tube 4, equipped with the swivel coupling member 10, is screwed over the threaded end 11 of the valve stem 12, as shown in Fig. 2. The mouth of this stem is brought into an air-tight contact with the annular washer 9, said washer being also in an airtight contact with the annular flange of the stem head 6. When in this position, the pin 7 on said stem head 6, depresses the valve pin 13 of the Schraeder valve 12, and by means of perforations 8 in the head 6 of the stem 5, establishes a passageway for air between the interior of the tube 4 and the interior of the tire 1.

While the tube 4 is thus coupled to the stem 12 of the tire valve, the pressure of air within tube 4 and the interior of the tire is equalized and the air contained in the tire would escape therefrom if it were not for the other Schraeder valve 16 shown in the opposite end of the tube 4, mounted externally. It is this air valve that keeps the pressure of air in the tire, as the first mentioned valve 13 is rendered inoperative, being kept in an open position by the action of pin 7. When it is desired to inflate the tire, the coupling of the hose which furnishes air from a pump, is applied to the stem 18 in a like manner as if it were applied to the stem of the valve mounted directly on the tire. When pin 17 is depressed by said air hose coupling, air is forced into the tube 4, and since valve 13 is inoperative, air is also forced through passages 8, past the valve 13 into the pneumatic tire as desired. Similarly, by applying the air gage to said stem 19, the pressure of air within the tube may be measured. The tire may be deflated by depressing the valve pin 17, when air contained in the tire and in the tube would be allowed to escape.

A modification of my combination is shown in Figs. 4, 5 and 6. The difference introduced by the modified construction lies mainly in the fact that the Schraeder valve 21, shown in Fig. 4, is normally in a position blocking the passage of air in or out of the tire. It is adapted, however, to be opened for passage of air by having the valve pin 22 depressed when desired. To effect this result, I employ a flexible wire cable within the air conducting tube 23. The end of the tube 23, which terminates in swivel coupling 24, is tightly fitted over a stem 29, one end of said stem opening into the interior of the tube, and the other end terminating in a flanged head 25, that is, a head with a flange of a somewhat larger diameter forming a part thereof. The swivel coupling 24, substantially like that shown in Fig. 2 and described above, is seated on the end of said stem 29 over said flanged head 25.

The cable is composed of a flexible wire 30 and closed within a flexible sheath 31, and is disposed within the air tube 23. The end of the wire is affixed to a slidable rod 27, adapted to project through an axially located opening in the head 25 of stem 29 and to depress the valve pin 22. Air passages in head 25 are indicated by numeral 26.

When coupling 24 is fully screwed over the end of the stem 29, the connection between the tube 23 and the mouth of said stem is air-tight, this being partly effected by employing rubber washers as described with reference to Fig. 2. The flexible wire 30, connected at one end to rod 27, as shown above, extends within said tube 23 to its external outlet where it again terminates in rigid rod or pin 34. The mouth of the tube encloses a bottle shaped fitting, preferably made of metal, and designed as a whole by numeral 35. The main body portion 36 of the fitting 35 is cylindrical in form with an internally threaded orifice to accommodate a nut-like member 37, provided with an axially disposed aperture 38 and a plurality of marginally disposed openings 39, as shown in Fig. 6. The neck portion 33 of said bottle shaped fitting 35 is provided with passages in parallel with the longitudinal axis thereof and corresponding to the apertures in the nut-like member 37, said perforations opening into said cylindrical section 36 of the fitting 35. The flexible wire 30 passes through the central opening 38 in the nut 37 into the interior section 36 where it is connected to the pin 34 passing through the axial opening in the neck portion 33 of the fitting 35. A coil spring 40, disposed in cylinder 36 and actuating the pin 34 by means of a transversely positioned shoulder 41, keeps the end of the pin 34 normally projecting out of the neck portion 33 of the fitting 35. Said neck portion is threaded to receive a conventional dust cap.

This arrangement of parts just described has two merits, as it dispenses with the additional valve in the external terminus of the air tube and as the air within the pneumatic tire is normally retained by means of the valve, said valve being normally closed.

When it is desired to inflate the tire, the coupling of the hose supplying air from a pump is applied to nipple 33 of the fitting 35. The application of this coupling depresses pin 34. This in turn actuates the flexible wire 30 which at its other end acts by means of rod 27 upon valve pin 22 opening said valve pin for admission of air conducted thereinto through tube 23. When the air hose coupling is removed, coiled spring 40, bearing against the shoulder 41, moves pin 34 back to its normal position shown in Fig. 5 and exerts a pull upon wire 30, retracting by means of said wire rod 27 from its depressing engagement upon valve pin 22. Relieved of pressure by said rod 27 upon its pin 22, valve 21 becomes closed.

In effect, therefore, means invented by me and shown in this modification provide a facility of controlling and acting directly upon the valve of the spare tire in the same manner as if said valve were directly accessible on the exterior of the automobile.

I realize that other modifications may be introduced in my improvement without materially departing from the spirit of my invention. What I, therefore, claim is:

A flexible tube of the kind described, serving to conduct air into a spare tire within the ordinarily closed trunk of an automobile, said tube comprising a swivel coupling at one end of the tube, designed to be removably attached to the air valve of said tire, a flexible wire longitudinally disposed within said tube and contained within a flexible sheathing longitudinally extending within said tube, one end of said wire terminating in an element within said coupling, adapted to open said tire valve, the other end of said wire terminating in the other end of the tube, a spring pressed perforated disc transversely disposed within the said other end of the tube, said disc being provided in the center thereof with a pin projecting outwardly in a manner to be depressed by the application of means supplying air to the tire and to slide the wire inwardly to open the air valve of the tube.

KASIMIR KOWALKIEWICZ.